United States Patent [19]

Shaw, Jr.

[11] Patent Number: 5,092,425

[45] Date of Patent: Mar. 3, 1992

[54] JET NOISE SUPPRESSOR AND METHOD

[75] Inventor: Leonard L. Shaw, Jr., Troy, Ohio

[73] Assignee: The United States of America as represented by the Secretary of the Air Force, Washington, D.C.

[21] Appl. No.: 502,948

[22] Filed: Apr. 2, 1990

[51] Int. Cl.⁵ .................................. F02K 1/34
[52] U.S. Cl. .......................... 181/213; 181/220; 181/296; 239/265.23; 244/1 N
[58] Field of Search .............. 181/213, 220, 221, 206, 181/296; 60/293, 602; 239/265.23; 381/71; 244/1 N

[56] References Cited

U.S. PATENT DOCUMENTS

| | | | |
|---|---|---|---|
| 2,944,624 | 7/1960 | Morley | 181/220 |
| 2,987,883 | 6/1961 | Lawler | 239/265.23 |
| 3,294,323 | 12/1966 | Ernst | 239/265.23 |
| 3,527,317 | 9/1970 | Motsinger | 181/206 |
| 3,826,331 | 7/1974 | Scharton et al. | 181/220 |
| 3,830,431 | 8/1974 | Schwartz | 239/265.11 |
| 4,199,295 | 4/1980 | Raffy et al. | 181/206 X |
| 4,255,083 | 3/1981 | Andre et al. | 181/206 X |
| 4,280,587 | 7/1981 | Bhat | 181/213 |
| 4,474,259 | 10/1984 | Wright | 181/220 |
| 4,805,733 | 2/1989 | Kato et al. | 181/206 |
| 4,934,481 | 6/1990 | Friedrich | 181/220 X |

Primary Examiner—Benjamin R. Fuller
Assistant Examiner—Alrick Bobb
Attorney, Agent, or Firm—Edward W. Nypaver; Donald J. Singer

[57] ABSTRACT

An apparatus for and method of suppressing noise generated by the primary exhaust gas flow from jet engine nozzles or the like without significantly affecting thrust. A secondary jet stream is provided exteriorly of the primary exhaust gas flow for interacting at the boundary between the exhaust gas flow and the ambient air immediately adjacent the exit end of the nozzle to preclude the formation and propagation of noise generating phenomena. The pressure of the secondary jet stream can be varied in accordance with noise levels sensed at the nozzle exit end to provide optimum noise suppression under essentially all conditions of exhaust gas flow.

14 Claims, 1 Drawing Sheet

JET NOISE SUPPRESSOR AND METHOD

RIGHTS OF THE GOVERNMENT

The invention described herein may be manufactured and used by or for the government of the United States for all governmental purposes without the payment of any royalty.

BACKGROUND OF THE INVENTION

The present invention relates generally to an apparatus for and method of suppressing noise and, more particularly, to a suppressor for abating the noise generated in the exhaust region of a jet engine.

A serious problem associated with the use of jet engines is the generation of irritating and intolerable noise resulting from the turbulent mixing of exhaust gases from the discharge nozzle of a jet engine into the ambient atmosphere. The near and far field noise levels generated by jet aircraft can result in structural failures and increased acoustic detection signatures. In light of this, as well as the noise pollution impact, particularly in populated areas, many efforts have been made to reduce, suppress, or otherwise control the noise generated by these jet engines. Various approaches to suppress such jet noise have been proposed. Two of the more effective older methods include placing tabs or notches within the exhaust nozzle adjacent the exit end thereof. However, the specific size and number of tabs or notches required to achieve accepted noise levels is not well defined and requires objectionable structural modifications. Because of the placement of such tabs within the exhaust nozzle, they not only adversely affect engine thrust because of partial blockage of the cross sectional area of the exhaust stream, but also must be fabricated from very expensive, high temperature resistant materials.

Other prior art efforts aimed at jet engine noise suppression include corrugated or fluted exhaust nozzles, additional passages connected to the exhaust gas flow, or annular passages within the nozzle producing concentric primary exhaust and fan flows exiting the jet engine nozzle outlet. While such efforts have at least partially suppressed jet engine noises, they have not been entirely satisfactory because they only interact with one or two limited number of the mechanisms or phenomena generating the noise. Additionally, such efforts have resulted in thrust loss and an increase in base drag. Moreover, most of these nozzle configurations, as well as the tab and notch expedients noted above, are rigidly fixed and designed for only one predetermined optimum engine exhaust flow condition and cannot accommodate the different exhaust flow conditions encountered during flight.

SUMMARY OF THE INVENTION

Accordingly, it is an object of the present invention to avoid the deficiencies noted above by providing an improved apparatus for and method of suppressing noise generated by jet engines without adversely affecting thrust.

It is another object of this invention to provide in the foregoing apparatus and method at least one secondary jet stream exteriorly of the exhaust gas nozzle for interacting with the primary exhaust gases to preclude the formation and propagation of noise generating phenomena.

It is still another object of the present invention to provide means varying the pressure of the foregoing secondary jet stream in accordance with variations in the noise levels generated by the jet exhaust gases.

The foregoing and other objects, advantages, and characterizing features of the present invention will become clearly apparent from the ensuing detailed description thereof considered in conjunction with the accompanying drawings wherein like reference numerals denote like parts throughout the various views.

In accordance with the present invention, an apparatus and method is provided for significantly suppressing noise generated by the exhaust gas flow exiting the nozzle of a jet engine or the like. The apparatus includes the provision of at least one conduit exteriorly of the nozzle and having an outlet located in the plane of the exhaust nozzle exit end for directing a secondary jet stream at the boundary region between the exhaust gas plume and the ambient air to minimize, if not preclude, the formation of phenomena which generate undesirable high levels of noise. The pressure of the secondary jet can be varied in accordance with variations in noise levels at the nozzle exit end to promote optimum noise abatement under essentially all conditions of exhaust gas flow.

BRIEF DESCRIPTION OF THE DRAWING FIGURES

DETAILED DESCRIPTION OF AN ILLUSTRATIVE EMBODIMENT

Figure 1:
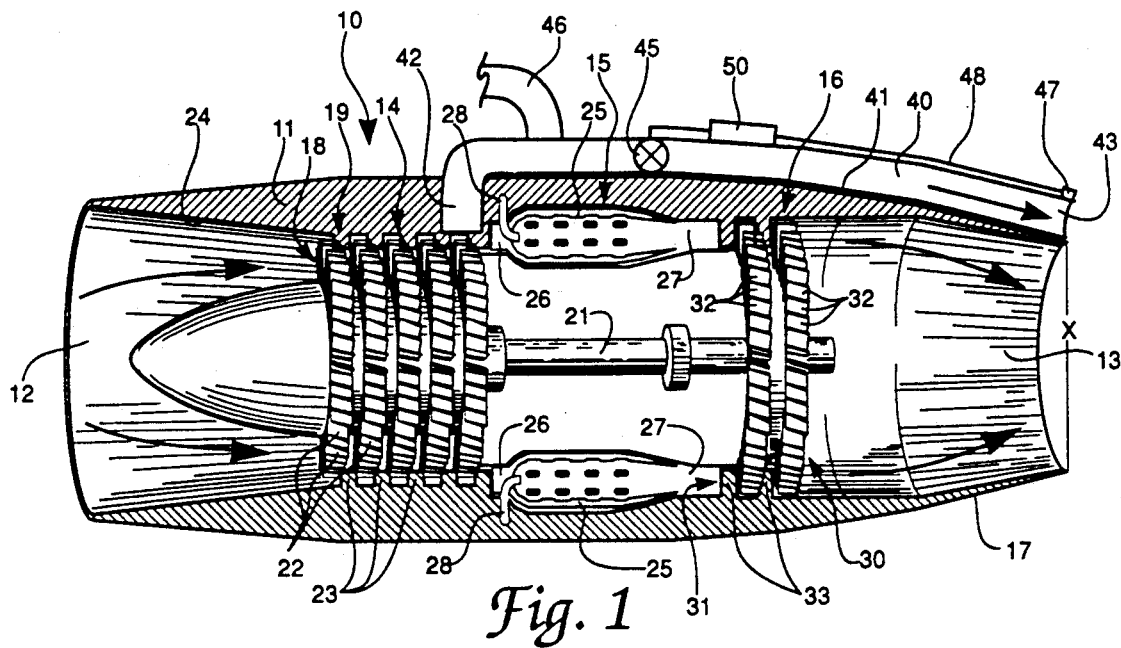
FIG. 1 is a simplified longitudinal sectional view of a conventional jet engine incorporating the novel noise suppressor of this invention.

Referring now in detail to the illustrative embodiment depicted in the accompanying drawings, there is shown in FIG. 1 a simplified conventional jet engine, comprehensively designated 10, embodying certain novel noise suppressing features of this invention which will hereinafter be fully described in detail. The jet engine 10 comprises a generally cylindrical casing 11 having an air intake passage or inlet 12 at the forward end and a jet exhaust passage or outlet 13 at the other or rearward end. Engine 10 includes a multi-stage axial compressor 14, a combustion section 15, a turbine 16, and an exhaust nozzle 17.

The compressor 14 comprises alternate sets of rotors 18 and stators 19, each of the former provided with a disc or hub (not shown) rigidly secured by any suitable means to a rotatable shaft 21 extending axially of engine 10. A plurality of circumferentially spaced blades 22 extend radially outwardly from the hub for rotation therewith. Each stator 19 comprises a plurality of circumferentially spaced vanes 23 fixedly secured to the inner wall surface 24 of casing 11 and projecting radially inwardly therefrom.

The combustion section 15 includes a series of circumferentially spaced combustion chambers 25 arranged in an annular pattern or row with each having an inlet 26 for receiving the highly compressed air flow from compressor 14 and an outlet 27 for directing combustion gases toward the turbine 16. Fuel under pressure is supplied from a suitable source (not shown) and injected into the combustion chambers 25 by fuel injectors 28.

The turbine 16 includes alternate sets of rotors 30 and stators 31, each of the former having a suitable disc (not shown) rigidly secured to shaft 21 and provided with circumferentially spaced, radially outwardly extending blades 32. Each stator 31 includes a series of circumferentially spaced vanes 33 secured to the inner wall surface 24 of casing 11 and projecting radially inwardly therefrom. The simplified jet engine 10 so far described is of a conventional and well known construction.

In operation, air is drawn through the intake passage 12 of engine 10 by means of the compressor 14 for compression thereby. This compressed air flows through the chambers 25 to support the combustion of fuel introduced by fuel injectors 28 for generation of a hot gas stream. The rise in temperature produces a considerable increase in the volume of gases which are expelled rearwardly for rotating the turbine rotors 30 which, in turn, drive the shaft 21 and thereby compressor 14. The hot pressurized gas stream is then discharged in a generally axial direction rearwardly through nozzle 17. The turbine 16 absorbs only so much energy from the combustion gases as is necessary to drive the turbine, the greater part of the energy being utilized to develop the propulsive thrust for the aircraft.

The combustion and exhaust of the burning fuel produces the primary power and thrust of the engine. The combustion products escaping axially in a flowing stream from the exhaust nozzle 17 at a high velocity form an exhaust plume, schematically and generally designated 34 in FIG. 2, trailing the engine and propogating rearwardly. The interfacing and intermingling of this exhaust plume 34 with the atmospheric gases of the ambient air defines a jet shear layer or irregular sonic boundary. The turbulent mixing of the hot gas plume 34 at such high velocity with the ambient air along the jet shear layer gives rise to the intolerable noise levels which are characteristic of conventional jet engines. This jet noise is generated by many phenomena or mechanisms depending on the characteristics of the exhaust gas plume 34. For example, large scale coherent modes or eddies, depicted schematically as 35 in FIG. 2, of generally toroidal or helical configuration winding about the periphery of plume 34 along the jet shear layer, are immediately generated at the nozzle exit plane, designated X in FIG. 2. Such large scale coherent eddies 35 interact with the high pressure gradient regions, i.e. shock waves, of the plume 34 resulting in increased noise generation. Also, this coherent eddie-plume interaction creates relatively small scale turbulence within the plume 34 to further amplify the noise generated thereby.

Figure 2:
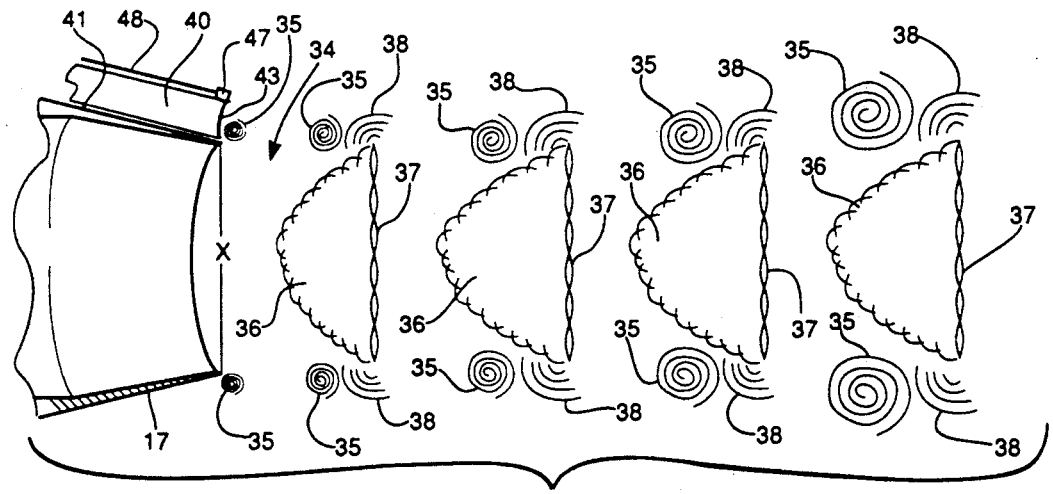
FIG. 2 is a schematic view illustrating some of the phenomena which generate noise in the exhaust gas plume of the jet engine of FIG. 1.

Another contributor to noise generation results from the deviation of the nozzle pressure ratio commonly referred to as the NPR, which is the ratio of the pressure aft of the turbine 16 and the ambient air pressure. When the actual NPR varies from the design NPR under varying exhaust flow conditions, shock cells, such as depicted schematically at 36 in FIG. 2, can occur within the exhaust plume 34. The shock cells produce shock waves, illustrated schematically as 37 in FIG. 2, at axially spaced intervals within the plume 34 to create additional noise. The shock-associated noise can be divided into two sources; a narrowband tone of high amplitude, commonly referred to as jet "screech", and a broadband component referred to as broadband shock cell noise. The latter is a natural result of the shock waves residing in the plume 34. The jet screech noise, depicted schematically as sound waves 38 in FIG. 2, is a result of the large scale coherent structure in the jet shear layer interacting with the shock waves 37. This generates fluctuating pressures which propagate upstream. As these fluctuating pressures travel upstream, they couple with the shear layer causing amplification of the coherent structure in the shear layer and results in a feedback process. When the phase relationship between the downstream traveling coherent structure in the shear layer and the upstream traveling pressure waves is matched, high amplitude screech tones are generated.

Figure 3:
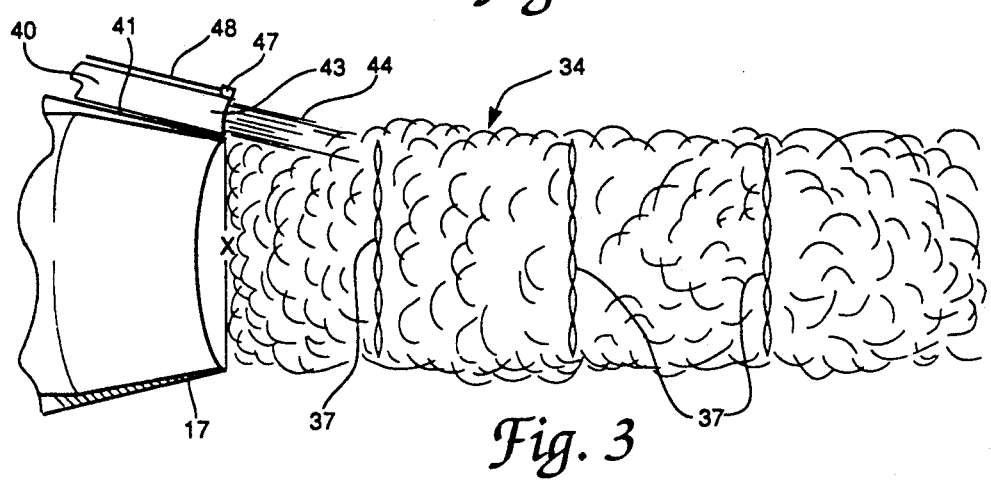
FIG. 3 is a view similar to FIG. 2 depicting the noise suppressor of this invention operable on the exhaust gas plume.

In accordance with the present invention, means are provided for suppressing the noise generated by the several noise phenomena described above. Such means comprises an elongated conduit 40 of any desired cross sectional configuration suitably rigidly secured to the outer surface 41 of engine casing 11 and extending longitudinally generally from the region of the compressor 14 rearwardly to the exhaust exit plane X. Conduit 40 can be formed of a unitary one piece construction of any suitable material. It needn't be fabricated from an expensive, exotic, high temperature material because it is not located within the nozzle or plume of the primary exhaust flow which may be heated to a very high temperature. Conduit 40 is formed with an inlet 42 in communication with the compressor 14 and an outlet 43 terminating at said exhaust exit plane X. Conduit 40 directs a secondary jet stream 44, shown in FIG. 3, of compressed or high pressure air from the compressor 14 toward outlet 43 and which emanates therefrom at exhaust exit plane X to immediately interact adjacent the jet shear layer i.e. the interface between plume 34 and the ambient air. This secondary jet stream 44 is discharged from the conduit outlet 43 at a slight angle relative to exhaust plume stream 34 such that the secondary jet stream 44 penetrates exhaust plume stream 34 as near as possible to exhaust exit plane X. While the secondary jet stream 44 preferably is comprised of air under pressure, it should be realized that the jet stream 44 can be formed of any suitable fluid under pressure within the purview of this invention.

The plume of this secondary jet stream engaging the exhaust gas plume 34 at the boundary where the plume 34 is intermixed with the ambient air forms a high impedance region in plume 34 and inhibits the formation and propagation of the large scale coherent eddies 35 otherwise generated at such boundary. Eliminating the formation of such large scale coherent eddies effectively minimizes noise generation. This secondary jet stream 44 also reduces the small scale turbulent structure in the primary exhaust stream or plume 34 by enhancing the mixing process to lesson the intensity of the small scale turbulence and thereby the noise levels generated thereby.

A significant feature of this invention resides in varying or adjusting the pressure of the secondary jet stream 44 to provide optimum noise suppression under all conditions of jet exhaust gas flow. To this end, a pressure regulating control valve 45 is provided to regulate the pressure of the air flow through conduit 40. An auxiliary air pressure line 46 connected to a suitable source of air under pressure (not shown) is tapped into conduit 40 to augment, when required, the air pressure generated by compressor 14. An acoustic sensing transducer 47 is mounted on conduit 40 at the exhaust exit end thereof for sensing the noise level or intensity of the flowing exhaust gases at exit plane X. Transducer 47 is electrically connected, as by conductor 48, to an automatic feedback controller 50 which is responsive to the signal generated by transducer 47 for activating pressure regulating control valve 45. As a result of the above arrangement, the pressure of the air conveyed through conduit 40 can be readily, automatically varied as dictated by the intensity of the noise level sensed by transducer 47 at the exhaust exit plane X.

Laboratory tests conducted on noise suppression by means of this invention have demonstrated a reduction of the acoustic pressure by 1000% or 20 decibels. To achieve this optimum degree of noise suppression at an NPR of 2.5, it has been found that the pressure required in the secondary jet is 60 psi. Should the NPR vary upwardly under different exhaust flow conditions causing greater noise levels sensed by transducer 47, the air pressure would automatically be increased in an effort to seek optimum noise suppression. Conversely, when exhaust gas flow conditions generate a lesser noise level, the air pressure accordingly would be automatically reduced. Thus, the capability of varying air pressure as dictated by varying noise levels permits the establishment of optimum noise suppression at varying conditions of exhaust gas flow.

While only one secondary jet stream 44 has been shown and described in the illustrative embodiment, it should be appreciated that two or more secondary jet streams can be provided and disposed in any desired angular pattern about the exhaust nozzle 17. Moreover, the cross sectional area, as well as the cross sectional configuration of conduit 40, can be varied, as desired, to produce a commensurate cross sectional dimension and configuration of the secondary jet stream. For example, conduit 40 can be of round, elliptical, polygonal, or any irregular shape within the purview of this invention. Also, while it was convenient to describe the noise suppressor of this invention in connection with a jet engine, it should be realized that the invention has utility in abating noise generated by any high velocity fluid exhaust system including non-aircraft jets and rockets.

From the foregoing, it is apparent that the present invention fully accomplishes its intended objects. The noise suppressor of this invention significantly minimizes the noise generated by the exhaust gas flow from a jet engine or any other high velocity gas flow from any source which intermingles with the ambient air. The secondary jet stream, which may be comprised of fluids other than air, directed at the interface between the exhaust gas plume and the ambient air serves to disrupt the formation of various sound phenomena which generate the irritating high amplitude screech tones associated with such exhaust gas discharge. By varying the pressure of this secondary jet stream as determined by the noise level at the exit plane of the nozzle, optimum noise abatement is achieved under varying conditions of exhaust gas flow. The use of the noise suppressor of this invention does not sacrifice thrust or power of the primary exhaust flow because neither the conduit nor associated components are located within the exhaust gas nozzle. The noise suppressor of the present invention can be readily and inexpensively retrofitted to existing jet engines and the like without any modifications to the exhaust gas nozzle.

It is to be understood that the form of the invention herewith shown and described is to be taken as an illustrative embodiment only of the same, and that various changes in the shape, size and arrangement of parts, as well as various procedural changes, may be resorted to without departing from the spirit and scope of the invention.

I claim:

1. A noise suppressor for an exhaust nozzle through which an axially flowing stream of high velocity fluids passes to form a trailing plume of varying noise levels and which interfaces and intermixes with ambient air, said nozzle terminating in an exit plane, comprising: a conduit mounted exteriorly of said nozzle for conveying a fluid under pressure therethrough, said conduit having an outlet at said exit plane and oriented at a slight angle relative to said plume of high velocity fluids for directing said fluid under pressure at said interface between said plume of high velocity fluid fulids and said ambient air at said exit plane, and means for varying the pressure of said fluid conveyed through said conduit.

2. A noise suppressor according to claim 1, including means adjacent said exit plane for sensing the levels of noise generated by the intermixing of said plume and said ambient air adjacent said exit plane.

3. A noise suppressor according to claim 2, wherein said sensing means comprises a transducer.

4. A noise suppressor according to claim 2, wherein said fluid pressure varying means includes means responsive to said sensing means.

5. A noise suppressor according to claim 1, including a jet engine having a casing terminating in a trailing portion, said exhaust nozzle forming the trailing portion of said casing.

6. A noise suppressor according to claim 5, wherein said high velocity fluid conveyed through said exhaust nozzle is high temperature combustion gases from said engine.

7. A noise suppressor according to claim 6, wherein said fluid under pressure is air.

8. A noise suppressor according to claim 5, including means adjacent said exit plane for sensing the levels of noise generated by the intermixing of said plume and said ambient air adjacent said exit plane, said fluid pressure varying means including means responsive to said sensing means.

9. A noise suppressor according to claim 8, wherein said high velocity fluid is high temperature combustion gases from said engine and said fluid conveyed through said conduit is air.

10. A method of suppressing noise generated by an exhaust gas stream emanating from a discharge nozzle exit end at varying noise levels and which interfaces and intermixes with ambient air comprising the steps of: generating a secondary jet stream of fluid under pressure exteriorly of said nozzle at said nozzle exit end, directing said secondary jet stream at the interface between said exhaust gas stream and said ambient air, and varying the pressure of said secondary jet stream in accordance with varying flow conditions of said exhaust gases exiting said nozzle.

11. A method according to claim 10, including the further step of sensing the noise levels generated at the nozzle exit end, and varying the pressure of said secondary jet stream in accordance with the noise levels sensed.

12. A method according to claim 11, including the further step of directing said secondary jet stream at a slight angle relative to said primary exhaust gases to engage said primary exhaust gas stream immediately upon leaving said nozzle exit end.

13. A method according to claim 10, wherein said primary exhaust gas stream is comprised of high temperature combustion gases.

14. A method according to claim 13, wherein said secondary jet stream of fluid is comprised of air.

* * * * *

UNITED STATES PATENT AND TRADEMARK OFFICE
CERTIFICATE OF CORRECTION

PATENT NO. : 5,092,425

DATED : March 3, 1992

INVENTOR(S) : Leonard L. Shaw, Jr.

It is certified that error appears in the above-identified patent and that said Letters Patent is hereby corrected as shown below:

Column 1, line 6, "government" should be -- Government --.

Column 6, line 13, "fluid fulids" should read --fluids--.

Signed and Sealed this

First Day of June, 1993

Attest:

MICHAEL K. KIRK

Attesting Officer

Acting Commissioner of Patents and Trademarks